United States Patent [19]
Drefahl

[11] Patent Number: 4,860,266
[45] Date of Patent: Aug. 22, 1989

[54] METHOD FOR OPERATING A TRANSMITTING/RECEIVING CIRCUIT AND A CIRCUIT UTILIZING THE METHOD

[75] Inventor: Dieter Drefahl, Hanau, Fed. Rep. of Germany

[73] Assignee: Honeywell Regelsysteme GmbH, Fed. Rep. of Germany

[21] Appl. No.: 87,008

[22] Filed: Aug. 19, 1987

[30] Foreign Application Priority Data

Sep. 11, 1986 [EP] European Pat. Off. ........ 86112595.3

[51] Int. Cl.$^4$ ............................................. G01S 15/14
[52] U.S. Cl. ....................................... 367/97; 367/103
[58] Field of Search ................. 367/97, 103; 342/103; 310/316, 317, 322, 326; 331/DIG. 2

[56] References Cited

U.S. PATENT DOCUMENTS

| | | | |
|---|---|---|---|
| 2,818,505 | 12/1957 | Keine | 328/70 |
| 4,282,452 | 8/1981 | Hassler et al. | 310/317 |
| 4,376,990 | 3/1983 | Metchev | 367/95 |
| 4,464,738 | 8/1984 | Czaykowski | 367/97 |
| 4,654,833 | 3/1987 | Drefahl | 367/138 X |
| 4,672,330 | 6/1987 | Floyd et al. | 342/103 X |
| 4,724,437 | 2/1988 | Jones et al. | 342/103 X |

Primary Examiner—Thomas H. Tarcza
Assistant Examiner—Tod Swann
Attorney, Agent, or Firm—Mitchell J. Halista; Albin Medved

[57] ABSTRACT

A transmitting/receiving circuit for an acoustic transducer (W1, W2) wherein the transmitting transducer (W1) is sequentially controlled by different modulated carrier frequencies (f1, f2), where the control is first matched to the inherent frequency (f1) of the transducer (W1) and afterwards the control of the transducer (W1) is by a frequency (f2) outside of the inherent frequency. During a signal reception by the receiving transducer (W2), a lock-out of a phase-locking circuit (PLL) is detected, where with an object to be measured is in a near range an active lock-out due to the frequency shift of the reception signal outside a frequency bandwidth of the phase-locking circuit is detected, and where with an object to be measured is in a far range, a passive lock-out is detected due to the fact that the reception signal amplitude falls below a noise level.

6 Claims, 3 Drawing Sheets

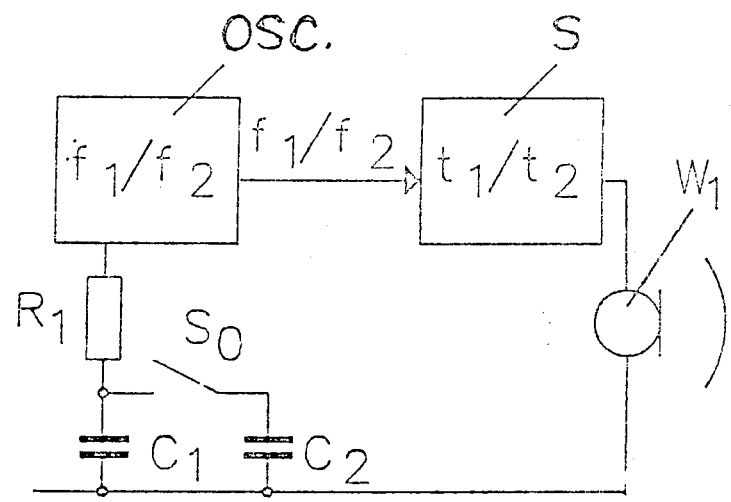
Fig. 5
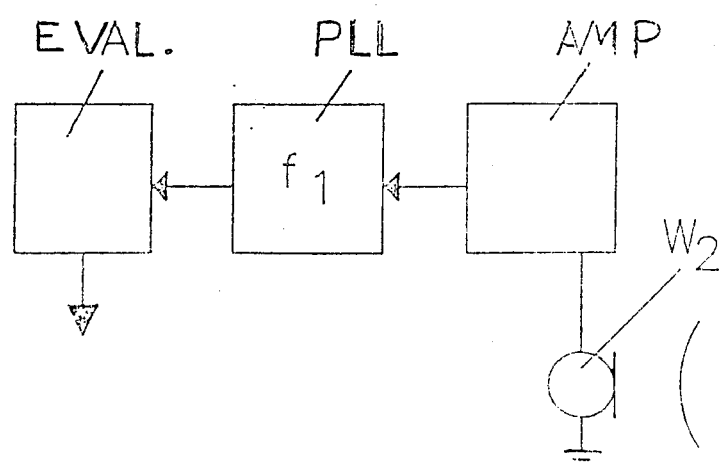

METHOD FOR OPERATING A TRANSMITTING/RECEIVING CIRCUIT AND A CIRCUIT UTILIZING THE METHOD

BACKGROUND OF THE INVENTION

1. Field of the Invention

The present invention relates to an improved method for operating a transmitting/receiving circuit as well as to a device utilizing the method.

2. Description of the Prior Art

For range metering of an object from a transmitter, it is known to measure the running time of a transmitter signal. In this connection, the use of a phase-locking circuit (PLL) for detecting the signal echo has advantages as for instance a low control resolution with high immunity from noise at the same time which makes useful the application of such a PLL circuit within the receiving portion. If such a PLL circuit is used as a trigger circuit for detecting the running time, inaccuracies of the measurement can result at a triggering on the leading edge, since lock-in of the phase-locking depends on the random phase of the received signal with respect to the phase of the free-running oscillator of the PLL circuit. The error appearing at triggering on the leading edge basically does not exist at the lock-out of the PLL circuit. As soon as the frequency of the received signal is not within the lock-in range of the PLL circuit or as soon as the amplitude of the received signal is below the detectable amplitude, the PLL circuit locks-out.

In the case of ultrasonic transmitters, piezo-ceramic sound transducers are commonly used for producing ultrasonic waves. Those transducers have basically a relatively small bandwidth with respect to their inherent frequency, i.e., in the transmitting mode the radiated spund pressure declines quickly outside the inherent frequency, and at the reception of a sound pressure signal the efficiency of the transducer quickly decreases outside the inherent frequency. From this behavior, different problems result in the event where an ultrasonic signal is switched-on for a certain time in the transmitting mode, and where the end of the received signal is detected in the receiving mode.

On the one hand, such transducers after their external excitation are still oscillating over a certain period, i.e., the output amplitude shows an exponential behavior of an attenuated oscillation. Since the echo amplitude may vary by a factor of 1000 or more depending on the range of the object to be measured, the phase-locking circuit locks-out later with a high amplitude rather than with a low amplitude or with a near object distance rather than a far object distance. This influence of the absolute echo amplitude on the lock-out point forms an essential error source. By a standardization of the signal by means of an automatic gain control as has been earlier provided a certain leveling may be achieved; however, a further error remains. The oscillations of a sound transducer excited exactly with its inherent frequency decline slower than an oscillation which is achieved by an excitation other than the inherent resonance of the sound transducer. With the dependency of temperature of the inherent frequency of the known piezo-ceramic sound transducers and their narrow-band behavior, the exact inherent frequency at the excitation of the transducer may be easily missed which results in a variation of the steepness of the trailing edge of the radiated signal, and therefore, results in a further system error.

By a forceable attenuation of the amplitude of the sound transducer after transmitting, for instance by means of driving with a counter-phased signal, as shown in U.S. Pat. No. 4,654,833, it is possible to achieve a quick decline of the radiated amplitudes in the range of high amplitudes. However, a controllable zero amplitude is not practically attainable within short time. Even if this would be possible, the decline of the received amplitude would be leveled down at the reception of an echo from a near object since in the near range the high acoustical received signal would excite the sound transducer to oscillations of relative high amplitude after the acoustical excitation has finished.

SUMMARY OF THE INVENTION

It is therefore an object of the present invention to provide a method for operating a transmitting/receiving circuit in which the accuracy of the running time measurement may be increased.

In accomplishing this and other objects, there has been provided, in accordance with the present invention, a method for operating a transmitting/receiving circuit including a transducer controlled by a modulated carrier frequency in its transmitting mode of operation, where the carrier frequency is matched to the inherent frequency of the transducer and frequency-selective device connected to the transducer for receiving reflected signals in its receiving mode of operation, where the frequency-selective device locks-in when the received signal exceeds a predetermined amplitude and has a frequency within a predetermined bandwidth with respect to the carrier frequency or locks-out when the received signal is below the predetermined amplitude and/or has a frequency outside of said predetermined bandwidth with respect to the carrier frequency including the steps of first driving the transducer during the transmitting mode of operation; with a first frequency matched to an inherent frequency of the transducer subsequently driving the transducer during the transmitting mode of operation; with a second frequency which is outside of the inherent frequency of the transducer and outside of the lock-in range of the frequency-selective device and evaluating during the receiving mode of operation the lock-out of the frequency-selective device.

An apparatus utilizing this method includes a transducer an oscillator alternately operating in a first frequency output mode matched to an inherent frequency of the transducer and a second frequency output mode outside of the inherent frequency of the transducer circuit means for applying the first and second frequency modes to the transducer during a transmitting mode of operation of the transducer and a frequency selective receiving circuit means connected to said transducer and responsive to received signals from said transducer in a receiving mode of operation for producing a lock-in when the received signal exceeds a predetermined amplitude and has a frequency within a predetermined bandwidth including the inherent frequency or a lock-out when the received signal is below the predetermined amplitude or outside the predetermined bandwidth including a phase-locking circuit.

BRIEF DESCRIPTION OF THE DRAWINGS

A better understanding of the present invention may be had when the following detailed description is read in connection with the accompanying drawings, in which:

FIG. 5 is a block diagram of a circuit device using the method according to the present invention.

DESCRIPTION OF THE PREFERRED EMBODIMENT

The present invention makes use of the division of a transducer transmitting time into two partial times t1 and t2 of nearly the same period, where during the time t1, the transducer is excited with its inherent frequency f1, and during the time t2 it is excited with a frequency f2 which is f1±x. With a supposed bandwidth $F_B$ of the sound transducer of f1+y and an assumed lock-in range $F_L$ of the phase-locking circuit of f1±z, whereat X, Y and Z are preselected numbers and x>y and x>z the following characteristic of the inventive method results:

The radiated amplitude with a frequency f1 increases after the start of transmitting to its maximum. Afterwards the amplitude remains at its maximum until the frequency shift is intentionally introduced. After the frequency shift has taken place, the frequency of the transducer as a function of its bandwidth is quickly adjusted to the new frequency f2. Since according to the definition this frequency is outside of the inherent frequency f1 of the transducer, this frequency is radiated with a lower amplitude. After the time t2 has lapsed, the transmitting with the frequency f2 is terminated.

By the use of a phase-locking circuit in the reception and detection for the near range and the far range of the echo reception, the following characteristics result:

With a high reception amplitude, i.e, at a strong echo due to a short distance of the object to be measured, and with a well-reflecting object the phase-locking circuit operated with a free-running frequency f1 locks-in at a random point of time given by the phase of the echo signal and the free-running frequency. Until the end of time t1 the phase-locking circuit remains locked-in. If now the echo shifts to the frequency f2, the amplitude of the echo becomes essentially lower but still may be evaluated. Therefore, the phase-locking device tries to keep track until the limit of its lock-in range and afterwards will lock-out. The product of inband-frequency and signal amplitude is zero since the received frequency is outside of the lock-in range of the phase-locking circuit. The lock-out effected by the frequency f2 outside of the lock-in range is an active lock-out, and a subsequent oscillation of the sound transducer does not take place. With lower amplitudes of the received signal the phase-locking circuit remains locked-in until the end of time t1. The sharp decline of the amplitude effected by the frequency shift results at the reception of the signal in an amplitude which is below the noise level. The phase-locking circuit now passively locks-out since the product of inband-frequency and signal amplitude decreases to zero due to the low amplitude.

Figure 1:
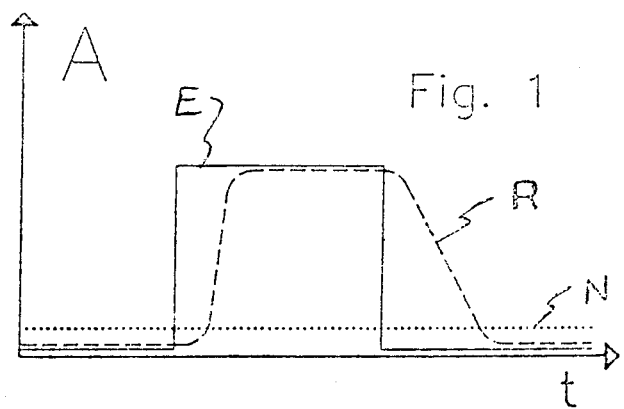
FIG. 1 is a waveshape diagram showing the behavior of an electrical excitation signal and of the resulting acoustical radiation of a transducer.
Figure 2:
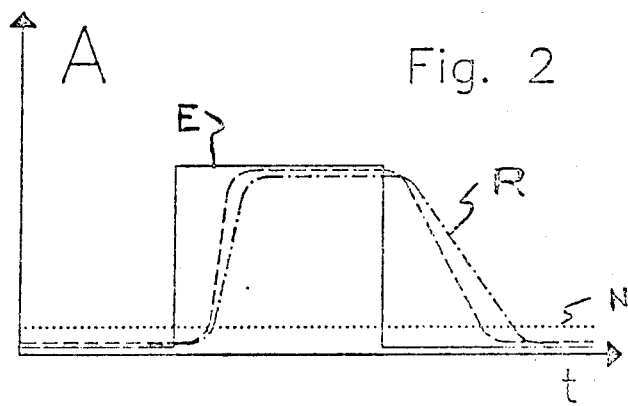
FIG. 2 is a waveshape diagram showing the same type signals as shown in FIG. 1 with the acoustical radiation being altered as a function of a matching to an inherent frequency of the transducer.

According to FIG. 1 the waveshape envelope of an electrical excitation signal E is shown, where the carrier frequency is matched to the inherent frequency of the transducer. The following discussion uses an acoustic transducer producing sound transmission as an example of an application of the present invention. The acoustical radiation R of the transducer is shown by a dashed line and a dotted line represents the noise level N below which no signal reception is possible. It can be noted that the acoustical transducer after its external excitation has finished is still oscillating for a rather long period, and the output amplitude of the acoustical radiation R shows the exponential behavior of an attenuated oscillation. If the inherent frequency of the acoustic transducer is slightly altered, which may happen at slow temperature deviations, then the trailing edge of the acoustic radiation R under certain circumstances may change to what is shown by the dash-dotted line in FIG. 2

Figure 3A:
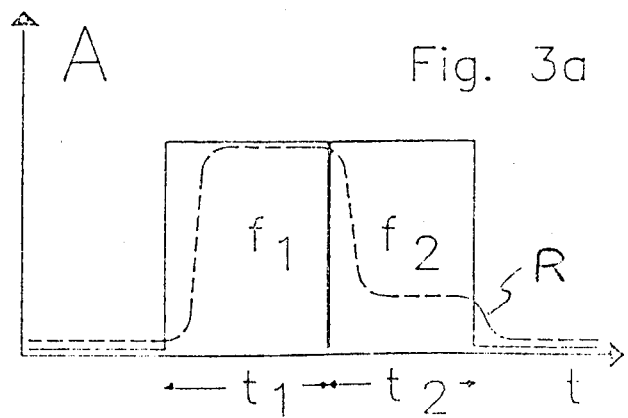
FIG. 3a is a waveshape diagram showing the behavior of two electrical excitation signals with different frequencies and the acoustical radiations effected by those signals.
Figure 3B:
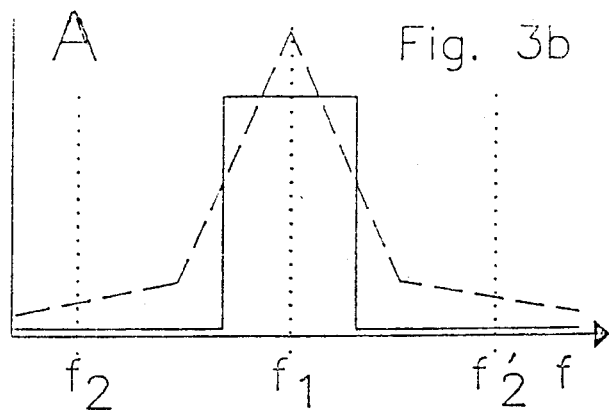
FIG. 3b is a waveshape diagram showing the behavior of the acoustical sound pressure as a function of the frequency and with respect to the lock-in range of the phase-locking circuit.

In order to avoid these problems, the transducer utilizing the method of the present invention is controlled during a time t1 with an excitation frequency f1 matched to the inherent frequency of the transducer and immediately after the time t1, the transducer is controlled by an excitation frequency f2 which is outside of the inherent frequency of the transducer. The behavior of the acoustical radiation R is shown in FIG. 3a by a dashed line. According to FIG. 3b, an acoustical sound pressure P as a function of the frequency is illustrated, which shows a remarkable maximum at the inherent excitation frequency f1 of the transducer. This sound pressure may be easily detected if the lock-in range of the phase-locking circuit is also matched to this inherent frequency, as shown by a dotted line.

Figure 4A:
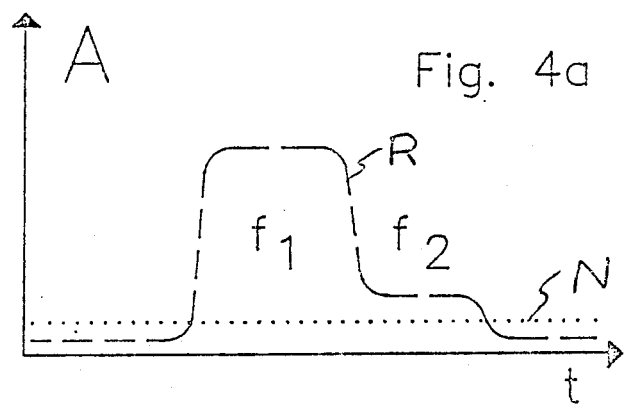
FIG. 4a is a waveshape diagram showing the behavior of the acoustical reception signal for an object in a near range.
Figure 4B:
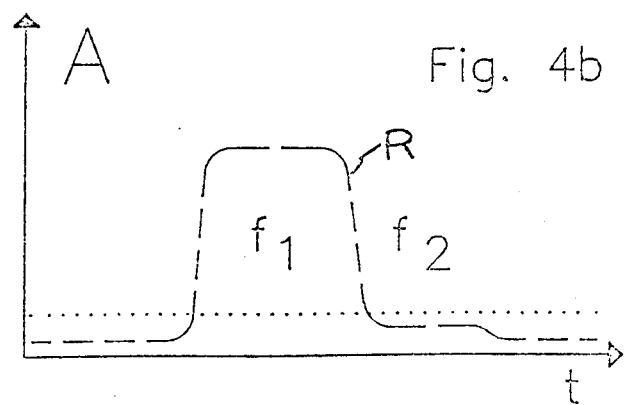
FIG. 4b is a waveshape diagram showing the behavior of the acoustical reception signal for an object in a far range.

If the object to be measured and irradiated by the sound waves is arranged in the near range of the transmitting/receiving circuit, then a behavior of the acoustical reception signal results as shown in FIG. 4a, where the sound waves R matched to the inherent frequency f1 of the transducer are above the noise level N, and the sound waves produced by the shifted frequency f2 show a reduced amplitude which also still exceeds the noise level N. Since, however, the phase-locking circuit is matched with its frequency to the inherent frequency f1 and the frequency f2 lies outside of the lock-in range, the phase-locking circuit locks-out actively when the frequency shift takes place. With an object to be measured lying in the far range the amplitude of the acoustical reception signal R falls below the noise level N when the frequency f2 outside of the inherent frequency f1 is used so that the phase-locking circuit locks-out passively since this amplitude is not further detectable as shown in FIG. 4b.

FIG. 5 shows a transmitting/receiving circuit which serves to implement the method according to the invention. The essential component is an oscillator OS switchable with respect to its frequency, e.g., the excitation with its inherent frequency f1 is determined by a RC member consisting of a resistor R1 and a capacitor C1, and the frequency f2 outside of the inherent frequency is produced by switching a further capacitor C2 parallel to the capacitor C1 by means of a switch S0. A switch S connected in series with the oscillator OSC. is cyclically closed during the times t1 and t2 so that the transducer W1 is controlled by an accordingly modulated carrier frequency during those times. The acoustical signal radiated by the transducer W1 is received by a transducer W2 after being reflected by an object to be measured (not shown). It should be noted that a single transducer for transmitting and receiving can be used. The acoustical signal received by the transducer W2 is converted into an electrical signal and after amplifying in an amplifier AMP is applied to the phase-locking circuit PLL. An evaluation circuit EVAL. connected to the phase-locking circuit PLL produces a stop signal when the output signal of the phase-locking circuit PLL switches, e.g., to zero, since either the received frequency lies outside of the lock-in range or the amplitude of the received signal lies below the noise level.

Accordingly, it may be seen that there has been provided, in accordance with the present invention, an improved method for operating a transmitter/receiver and an apparatus utilizing the method.

The embodiments of the present invention in which an exclusive property or privilege is claimed are defined as follows:

1. A method for operating a transmitting/receiving circuit including a transducer controlled by a modulated carrier frequency in its transmitting mode of operation, where the carrier frequency is matched to the inherent frequency of the transducer and frequency-selective device connected to the transducer for receiving reflected signals in its receiving mode of operation, where the frequency-selective device locks-in when the received signal exceeds a predetermined amplitude and has a frequency within a predetermined bandwidth with respect to the carrier frequency or locks-out when the received signal is below the predetermined amplitude or has a frequency outside of said predetermined bandwidth with respect to the carrier frequency including the steps of first driving the transducer during the transmitting mode of operation with a first carrier frequency matched to an inherent frequency of the transducer, subsequently driving the transducer during the transmitting mode of operation with a second carrier frequency which is outside of the inherent frequency of the transducer and outside of the lock-in range of the frequency-selective device and evaluating during the receiving mode of operation the lock-out of the frequency-selective device.

2. A method according to claim 1 wherein the modulation periods of the first and second carrier frequencies are approximately the same.

3. The method according to claim 2 wherein the second carrier frequency f2 is chosen with respect to the first carrier frequency f1 as follows:

$$f2 = f1 \pm x \, [\%]$$

that the bandwidth of said transducer has the following value:

$$[F_H] \, F_B = f1 \pm y [\%] \text{ and}$$

that the lock-in range of the frequency-selective device is chosen as follows:

$$[f] \, F_L = f1 \pm z [\%]$$

where X, Y and Z are preselected numbers and the following is true:

$$X > Y \text{ and } X > Z.$$

4. A transmitting/receiving circuit comprising
a transducer,
a transmitting circuit means for controlling a transmission by said transducer in a transmitting mode of operation including a switchable oscillator alternately operating in a first frequency output mode matched to an inherent frequency of said transducer and a second frequency output mode outside of the inherent frequency of said transducer and circuit means for applying the first and second frequency modes to said transducer during the transmitting mode of operation and
a frequency selective receiving circuit means connected to said transducer and responsive to received signals from said transducer in a receiving mode of operation for producing a lock-in when the received signal exceeds a predetermined amplitude and has a frequency within a predetermined bandwidth including the inherent frequency or a lock-out when the received signal is below the predetermined amplitude or outside the predetermined bandwidth and including a phase-locking circuit.

5. A circuit according to claim 4 wherein said phase-locking circuit includes a voltage controlled oscillator controllable with respect to its output frequency and used in, the transmitting mode as well as in the transmitting mode, where in the receiving mode the voltage controlled oscillator of said phase-locking circuit is first operated at the inherent frequency of said transducer and subsequently is operated outside the inherent frequency of said transducer.

6. A circuit according to claim 4 wherein said transducer is an acoustic transducer.

* * * * *